April 20, 1948. W. A. WEIGHTMAN 2,439,834
PORTABLE ROLLER WELDER
Filed March 29, 1944 5 Sheets-Sheet 4

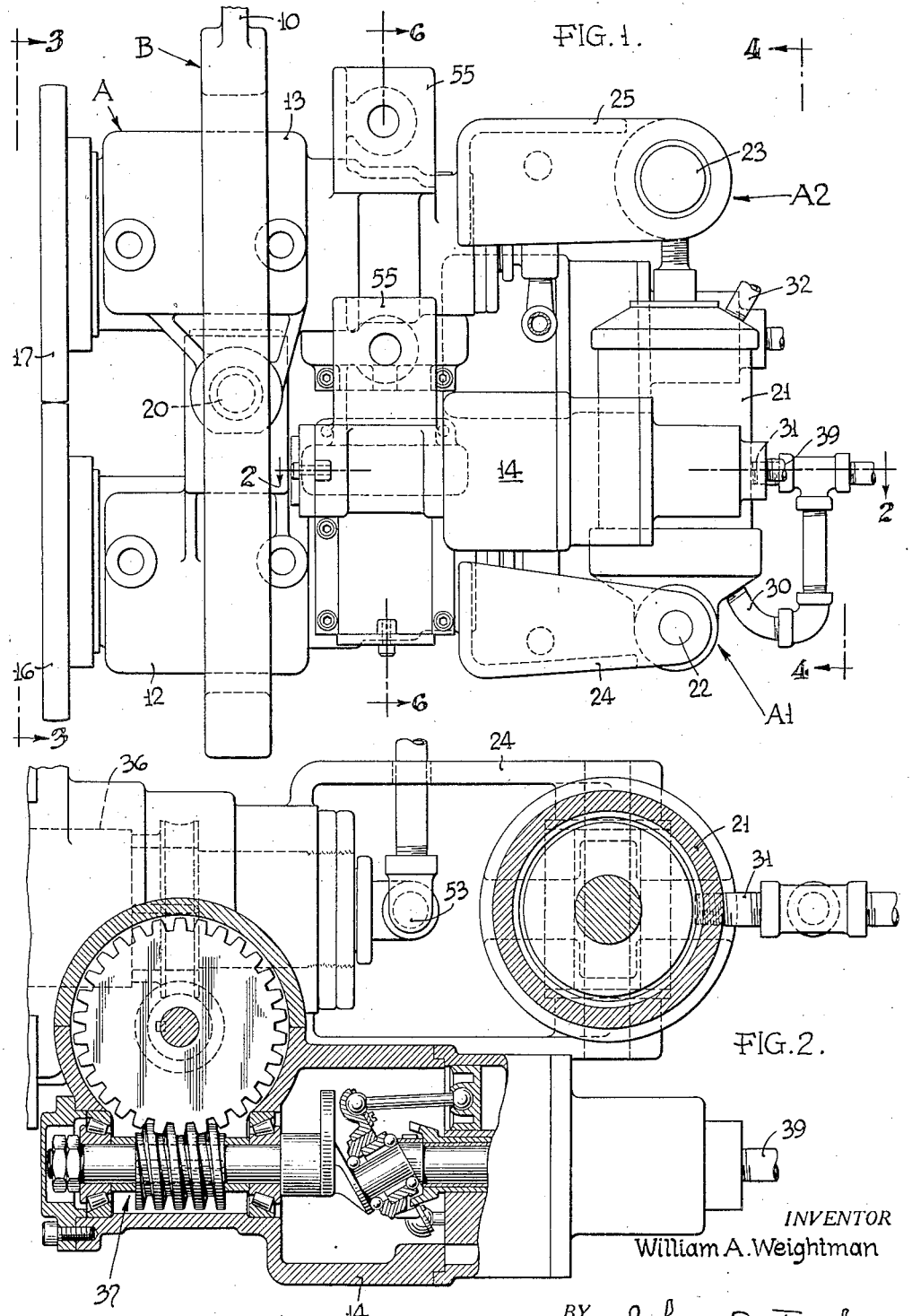

INVENTOR
William A. Weightman
BY John P. Tarbox
ATTORNEY

Patented Apr. 20, 1948

2,439,834

UNITED STATES PATENT OFFICE 2,439,834

PORTABLE ROLLER WELDER

William A. Weightman, Philadelphia, Pa., assignor to The Budd Company, Philadelphia, Pa., a corporation of Pennsylvania Application March 29, 1944, Serial No. 528,577

14 Claims. (Cl. 219—4)

This invention relates to roller welders, particularly to portable roller welders, and has for an object the provision of improvements in this art.

One of the particular objects is to provide a roller welder in which both rolls are positively driven to avoid slippage of one or the other rolls on the stock.

Another object is to provide a portable roller welder in which separate drive motors are mounted upon the portable assembly.

Another object is to provide means for adjusting the roll and drive for one side of the assembly relative to the other side of the assembly.

Another object is to provide a turnable mounting for the entire roller welder assembly whereby the rolls may be turned within the supporting mounting and assume a position of stable equilibrium at any angle to the vertical.

Another object is to provide an improved pressure motor and an improved arrangement thereof.

The above and other objects and advantages of the invention will be apparent from the following description of an exemplary embodiment thereof, reference being made to the accompanying drawings, wherein:

Fig. 1 is a side elevation of a portable roller welder embodying the invention;

Fig. 2 is a partial horizontal section taken on the line 2—2 of Fig. 1;

Figure 3:
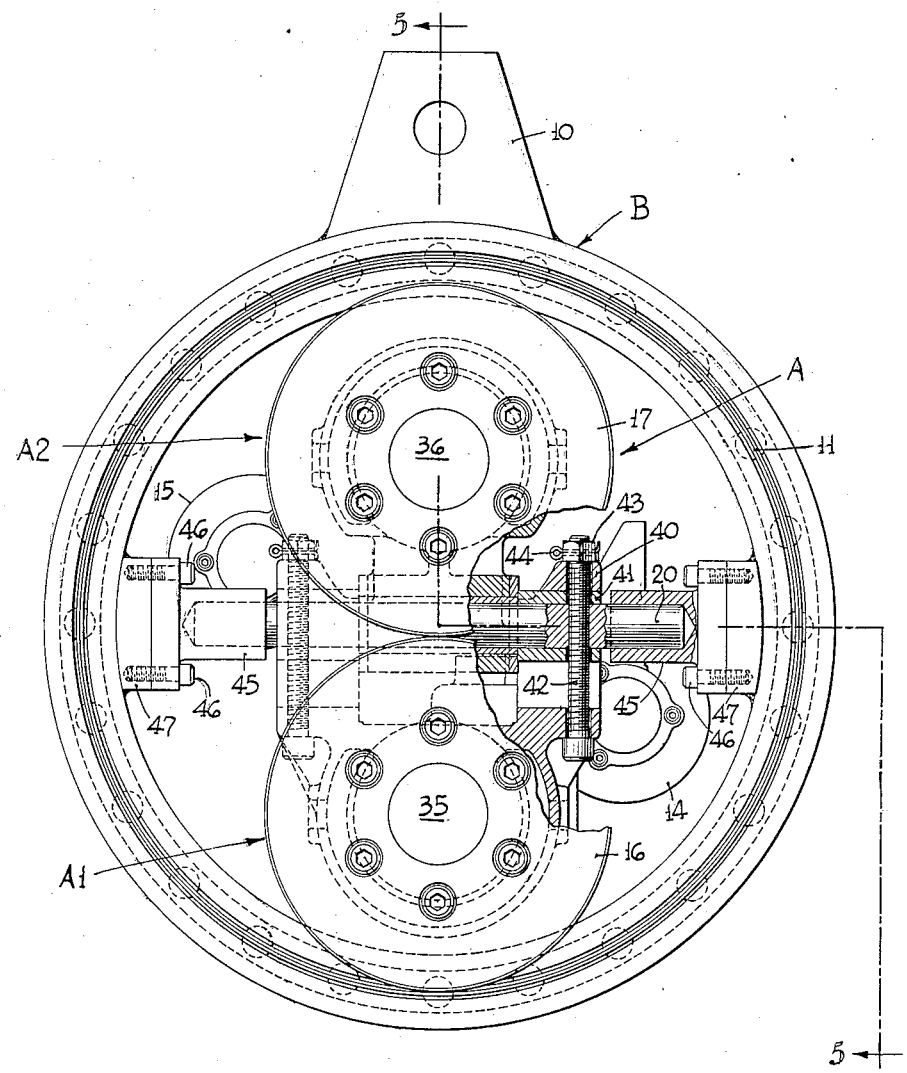
Fig. 3 is an end elevation taken at the left of Fig. 1, parts on the pivot axis being broken away to reveal internal structure.
Figure 4:
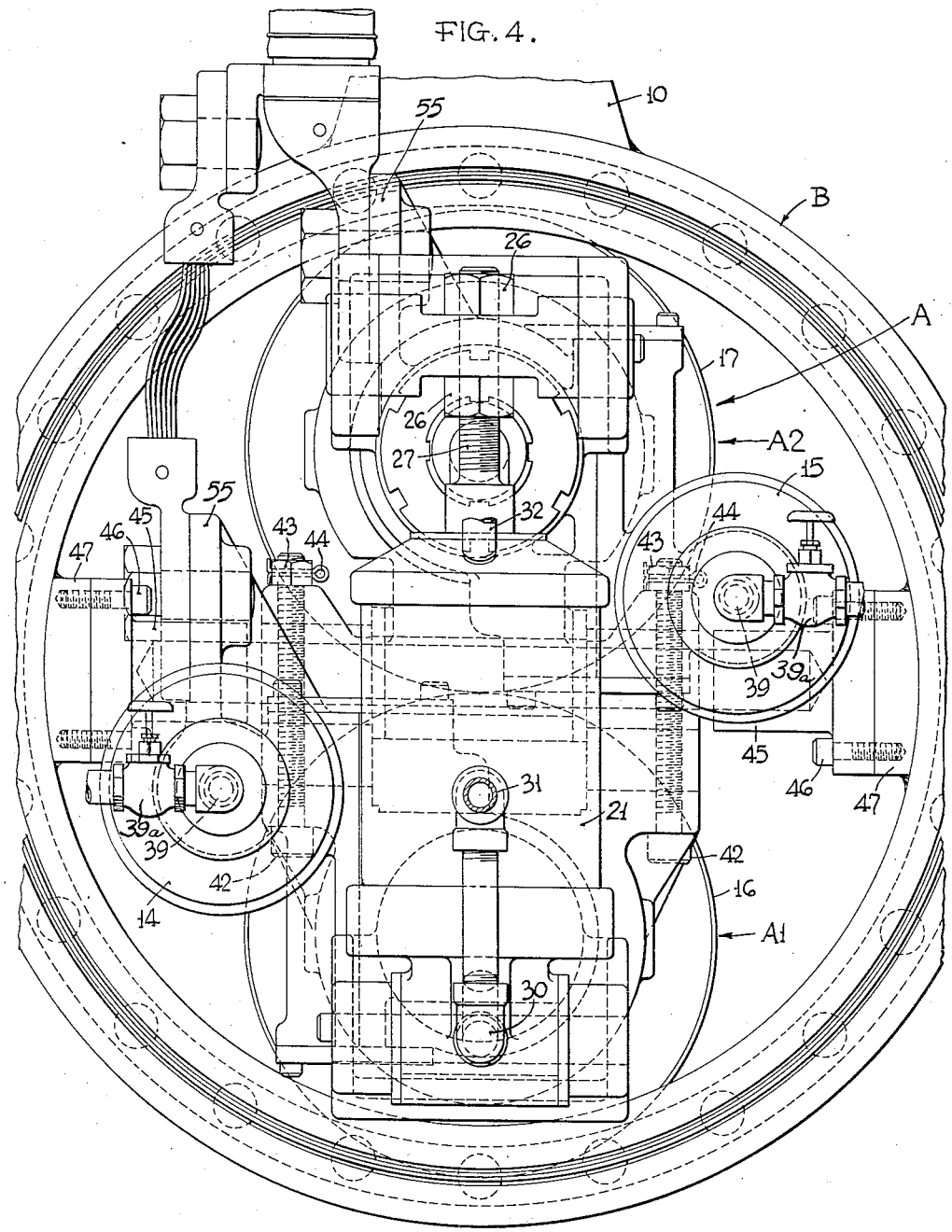
Fig. 4 is an enlarged end elevation taken at the right of Fig. 1.
Figure 5:
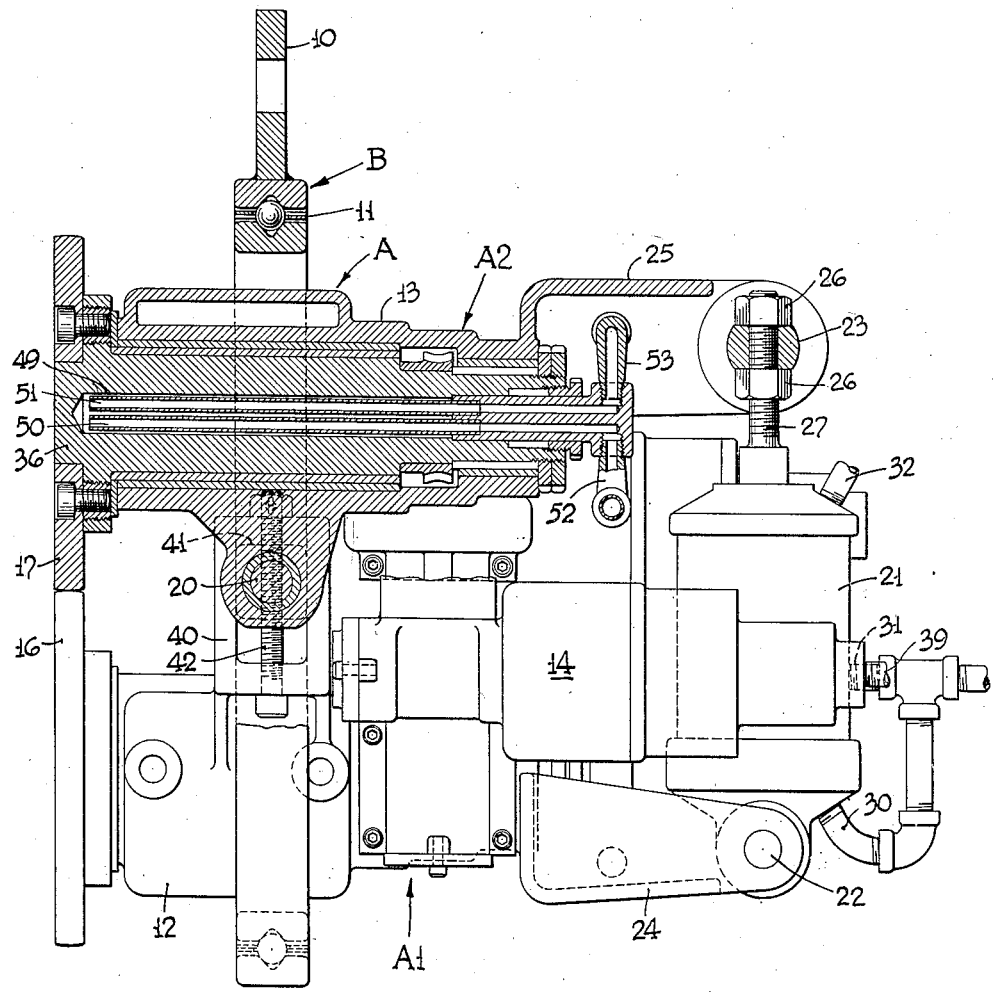
Fig. 5 is a vertical section and elevation taken on the line 5—5 of Fig. 3.
Figure 6:
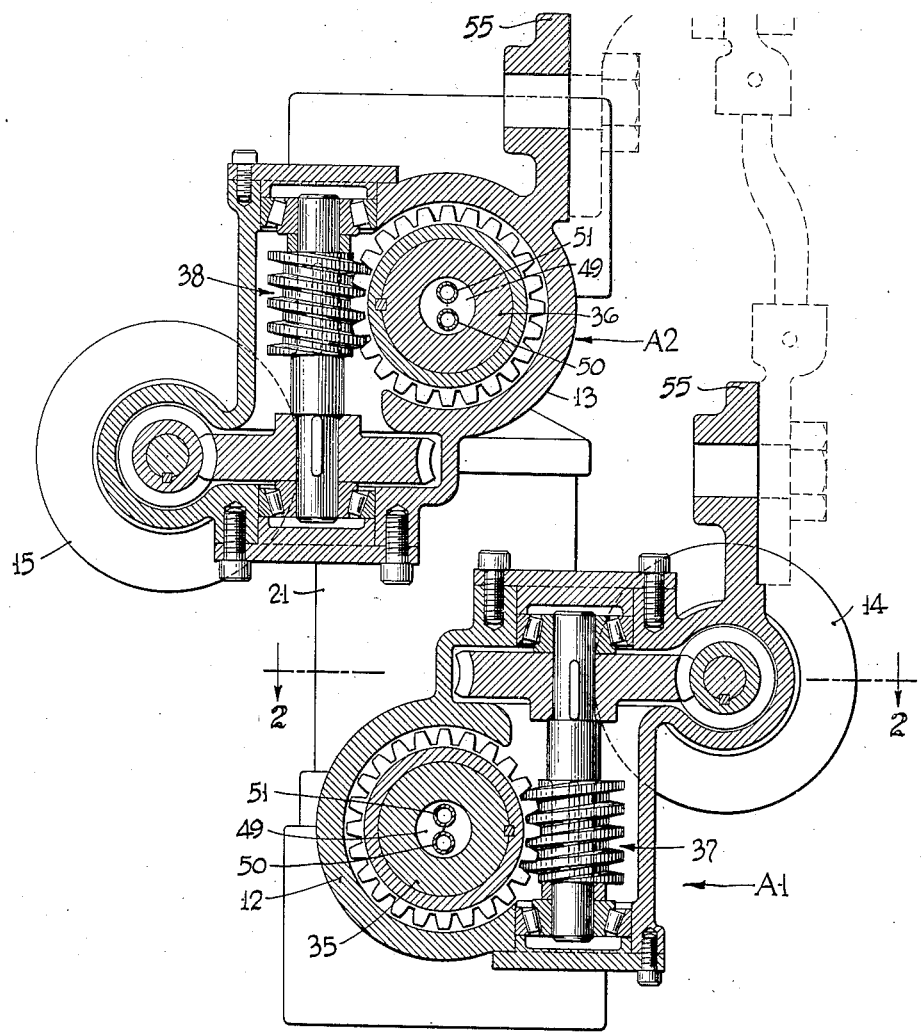
Fig. 6 is a vertical section taken on the line 6—6 of Fig. 1.

Referring to the drawings, the welder comprises the welder assembly proper A carried by a support B, the support here being in the form of a gimbal ring provided with a suspension eye 10. As shown in Figs. 3, 4 and 5, a ball bearing assembly 11 is disposed in grooves between the gimbal rings.

The welder assembly proper A comprises two generally symmetrical parts A1 and A2 comprising frames 12, 13, drive motors 14, 15 and welding rolls 16, 17. The frames 12, 13 are, in effect, arms or levers which are pivoted together in the fashion of scissors by a hinge shaft 20. The arms are operated by a pressure motor 21 connected by pivot pins 22, 23 to arm extensions 24, 25. In the present embodiment, the motor is of the fluid operated piston type with the cylinder element connected to the pin 22 and the piston element connected to the pin 23. The latter connection is adjustable as by spaced nuts 26 on the threaded stem 27. To obtain heavy pressure in a small space, tandem pistons are employed, fluid, such as air, being admitted at nipples 30 and 31 on the head end to press the rolls together upon the stock and at nipple 32 on the rod end to move the rolls apart.

The rolls 16, 17 are mounted on shafts 35, 36 carried by bearings formed in the frame parts. They are driven by the fluid drive motors 14, 15 through suitable speed reduction gearing 37. The motors are preferably air driven and of the multiple axial-piston wabble plate type, the pistons and shafts being aligned with the roll axes for conservation of space and balance within the gimbal ring and also to minimize vibration transversely of the roll shafts. Air feed tubes 39 with throttle valves 39a to equalize the action of the motors are shown.

The rolls and their frames are adjustable relative to each other to take care of changed roll sizes or different stock thickness while keeping the roll planes aligned in work-engaging position. This is accomplished by providing guide loops 40 on one frame, the lower here, which embrace the pivot shaft 20 and guide blocks 41 secured thereon. Adjusting movement is produced by screws 42 threaded in the shaft 20 and provided with locknuts 43 and cotter pins 44 to maintain adjusted position. The pivot shaft 20 is turnably mounted in end bearing brackets 45 secured by bolts 46 to seats 47 inside the inner gimbal ring. By this arrangement the arms may be adjusted when desired or readily separated completely.

Coolant, such as water, is circulated through a passage 49 in the roll shafts 35, 36 by pipes 50, 51, pipe connections 52, 53, and flexible tubes carried upward to the overhead support, ample slack being provided for the turning movement of the welder in its gimbals.

The air lines for the several motors and the power leads 55 are likewise carried upward to a support with ample length to permit turning of the welder in its bearing support without material resistance.

The operation and advantages of the apparatus will be evident to those skilled in the art from the foregoing description.

While one embodiment of the invention has been described for purposes of illustration, it is to be understood that the invention may be variously embodied within the limits of the prior art and the scope of the subjoined claims.

What is claimed is:

1. A roller welder comprising spaced arms, a welding roll mounted on each arm, and separate prime movers mounted on the arms for driving each of said rolls.

2. A portable roller welder comprising spaced arms carrying welding rolls mounted for rotation and for movement relative to each other, a drive motor on each arm geared to drive a roll, and a pressure motor mounted between the arms for moving the rolls relative to each other.

3. A portable roller welder comprising roller-supporting arms pivoted for movement of the rolls relative to each other, and means forming part of the pivot connection for adjusting the spacing of one arm relative to the other.

4. A portable roller welder comprising roll-supporting arms pivoted for movement of the rolls relative to each other, motive pressure means for moving said arms and rolls relative to each other, means for adjusting said arms relative to each other through the pivot connection, and means for adjusting the arms relative to each other through the motive pressure means.

5. A portable roller welder comprising scissor arms carrying rolls transverse to the arm axes, and means for adjusting said arms as a unit in a plane which is generally parallel to the plane of the rolls, whereby the relative position of the rolls is changed.

6. A portable roller welder comprising scissor type arms mounted on a pivot, each arm carrying a rotatable welding roll and a fluid drive motor, and a fluid pressure motor mounted between the arms.

7. A portable roller welder comprising arms mounted on a pivot, welding rolls mounted for rotation on axes parallel to the arm axes, an air drive motor on each arm having a piston axis parallel to the arm axis, and a reciprocating motor mounted between the arms.

8. A portable roller welder comprising arms mounted on a pivot, welding rolls mounted for rotation on axes parallel to the arm axes, an air drive motor on each arm having a piston axis parallel to the arm axis, and a reciprocating motor mounted between the arms, the drive motors being mounted on opposite sides of the pressure motor.

9. A portable roller welder comprising arms mounted on a pivot, welding rolls mounted for rotation on axes parallel to the arm axes, a pressure motor between the arms, drive motors on the arms having axes parallel to the arms and on opposite sides of the pressure motor, and supporting means for the welder providing rotation about a central axis parallel to the arm axes, said supporting means including a gimbal ring positioned with its plane parallel to the plane of the welding rolls and adjacent the drive motors.

10. A portable roller welder and a support therefor comprising coacting coplanar electrode rollers, relatively movable arms for supporting said rollers, and a supported gimbal ring in which the arms are rotatably mounted, the plane of the gimbal ring being parallel to the plane of the welding rolls.

11. A portable roller welder comprising a support, juxtaposed arms mounted on the support, rollers attached to said arms, pivot means for supporting said arms to permit relative cooperative movement between said rollers, and means for adjusting the spacing of the rollers relative to each other.

12. A portable roller welder comprising a support, juxtaposed arms mounted on the support, rollers attached to said arms, pivot means for supporting said arms to permit relative cooperative movement between said rollers, and shifting means for shifting the pivot relative to the support whereby the relative position of the rollers is modified.

13. A portable welder comprising coacting coplanar electrodes, relatively movable arms for supporting and moving said electrodes into and out of engagement with each other, and a gimbal ring for supporting said arms rotatably, the planes including said gimbal and the electrodes being parallel.

14. A portable roller welder comprising coacting arms, a common pivot for said arms, bearing means for supporting said pivot at varied points of adjustment relative to said arms, and means for moving said bearing means.

WILLIAM A. WEIGHTMAN.

REFERENCES CITED

The following references are of record in the file of this patent:

UNITED STATES PATENTS

| Number | Name | Date |
|---|---|---|
| 1,248,927 | Schkommodan | Dec. 4, 1917 |
| 1,291,501 | Hatch | Jan. 14, 1919 |
| 1,310,127 | Merrill | July 15, 1919 |
| 1,993,961 | Groven et al. | Mar. 12, 1935 |
| 2,023,086 | LaVallee | Dec. 3, 1935 |
| 2,105,907 | Demers | Jan. 18, 1938 |
| 2,206,549 | McIntosh et al. | July 2, 1940 |
| 2,227,249 | Ganahl | Dec. 31, 1940 |
| 2,236,403 | Kaunitz | Dec. 7, 1943 |

FOREIGN PATENTS

| Number | Country | Date |
|---|---|---|
| 670,694 | Germany | Jan. 23, 1939 |